United States Patent [19]

Brusasco

[11] Patent Number: 5,111,708
[45] Date of Patent: May 12, 1992

[54] ELECTROMECHANICAL LINEAR ACTUATOR

[75] Inventor: Enzo Brusasco, Turin, Italy

[73] Assignee: R.G.B. S.p.A., Turin, Italy

[21] Appl. No.: 491,109

[22] Filed: Mar. 9, 1990

[30] Foreign Application Priority Data

Mar. 9, 1989 [IT] Italy .................. 67162 A/89

[51] Int. Cl.⁵ .................. F16H 29/20; H02K 7/06
[52] U.S. Cl. .................. 74/89.15; 74/89.22; 310/83
[58] Field of Search .................. 74/89.15, 89.22, 606 R; 310/89, 51, 83

[56] References Cited

U.S. PATENT DOCUMENTS

| | | | |
|---|---|---|---|
| 2,874,008 | 2/1959 | Orte et al. | 310/51 X |
| 3,256,828 | 6/1966 | Rule | 310/51 X |
| 3,270,222 | 8/1966 | Shaffer | 310/51 |
| 4,137,784 | 2/1979 | Griffin | 74/89.15 |
| 4,679,451 | 7/1987 | Nakamura | 74/606 R |
| 4,747,319 | 5/1988 | Sakuta | 74/89.15 |
| 4,787,260 | 11/1988 | Bailey | 74/89.15 |
| 4,790,201 | 12/1988 | Gheddo | 74/89.15 |
| 4,858,481 | 8/1989 | Abraham | 74/89.15 |
| 4,903,535 | 2/1990 | Kikuta et al. | 74/89.15 X |

Primary Examiner—Allan D. Herrmann
Assistant Examiner—Julie Krolikowski
Attorney, Agent, or Firm—Klauber & Jackson

[57] ABSTRACT

A linear actuator wherein a load-bearing body or structure made of relatively heavy metal provides for flexibly supporting an electric motor, the output shaft of which is connected, via a belt drive, to a tubular shaft parallel to the output shaft of the motor, and connected in rotary manner, at a first point, to the load-bearing structure and, at a second point, to a plastic element integral with the load-bearing structure; the output member of the actuator consisting of a screw coaxial with the tubular shaft and connected to the same via a recirculating-ball screw-nut-screw coupling.

5 Claims, 1 Drawing Sheet

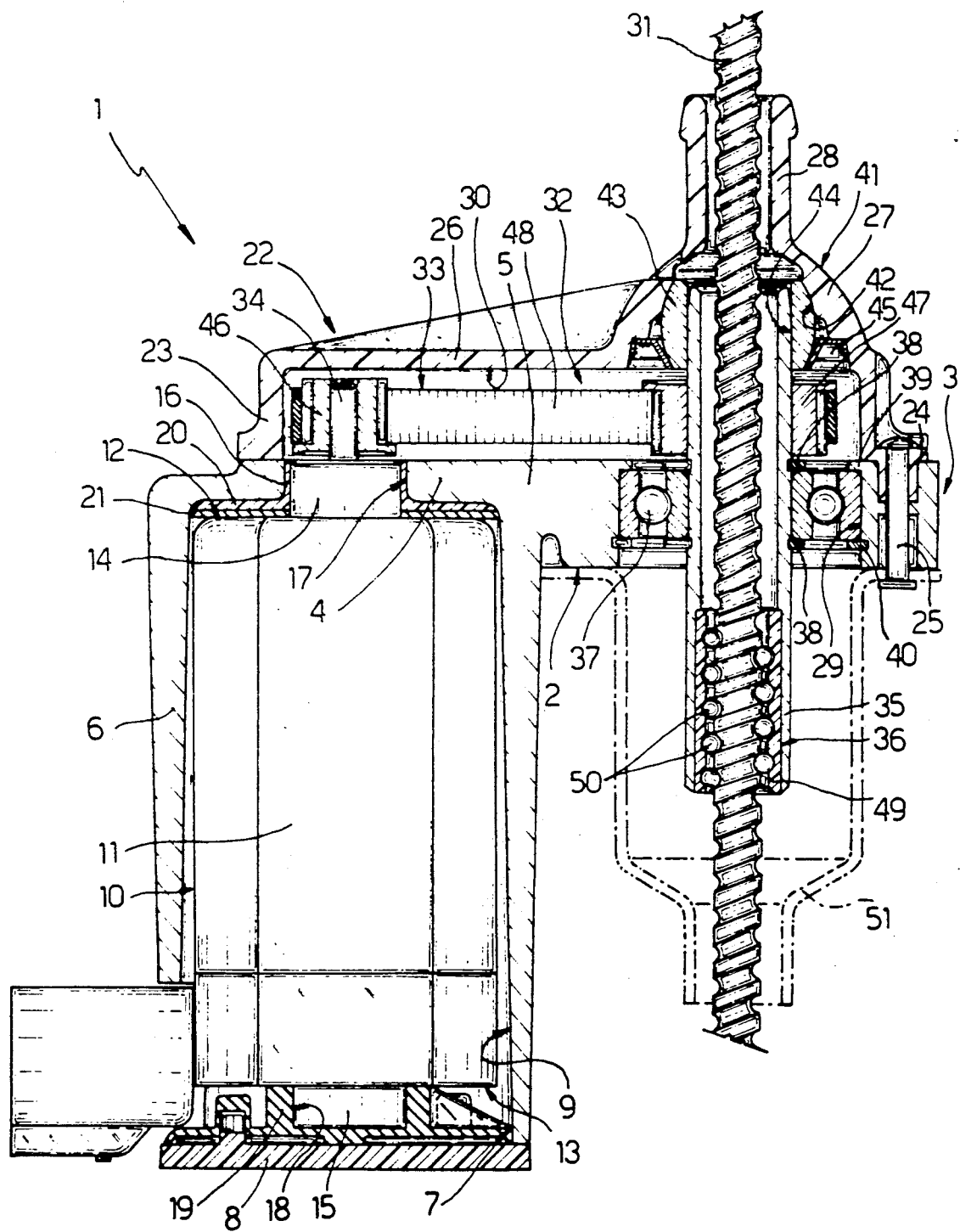

ELECTROMECHANICAL LINEAR ACTUATOR

BACKGROUND OF THE INVENTION

The present invention relates to an electromechanical linear actuator.

In particular, the present invention relates to an electromechanical linear actuator comprising an electric motor with a rotary output shaft, and a straight-line output member.

Linear actuators of the aforementioned type are known to comprise an electric motor with a hollow shaft, designed to impart reciprocating straight-line motion to an output rod extending coaxially through the hollow shaft and connected to the same via a screw-nut-screw coupling.

Though perfectly functional in most respects, known linear actuators of the aforementioned type present a number of both economic and functional drawbacks, due to the hollow-shaft electric motors employed, which are invariably more cumbersome and expensive than the equivalent solid-shaft types.

A known method of overcoming the above drawbacks is to employ a standard solid-shaft motor on which the hollow shaft is located externally using a tubular shaft parallel to the output shaft of the motor and connected to the same via any type of parallel rotary shaft drive. Though relatively straightforward in terms of design, the above solution is extremely difficult to actually implement for achieving an actuator with a relatively high degree of precision and long working life.

Long working life of the actuator, in fact, is usually only obtainable by providing for relatively rigid support of the driven tubular shaft, so as to ensure substantially perfect parallelism between the tubular shaft and the output shaft of the motor. Such a solution, however, invariably results in the vibration produced by the motor being transmitted to the driven tubular shaft, and in impaired performance of the screw-nut-screw coupling.

SUMMARY OF THE INVENTION

The aim of the present invention is to provide a linear actuator designed to enable employment of a standard solid-shaft electric motor, while at the same time providing for relatively low-cost production, high operating precision and long working life.

With this aim in view, according to the present invention, there is provided an electromechanical linear actuator comprising an electric motor with a rotary output shaft; a load-bearing structure defining a housing for said electric motor; a tubular shaft substantially parallel to said output shaft and having a first portion connected in rotary manner to said load-bearing structure; an output member coaxial with said tubular shaft; a parallel rotary shaft drive located between said tubular and said output shafts; and a screw-nut-screw coupling located between said tubular shaft and said output member; characterised by the fact that it also comprises a supporting member integral with said load-bearing structure and having means for connection in rotary manner to a second portion of said tubular shaft; said load-bearing structure being made of relatively heavy material; said drive comprising a flexible drive member; and damping means being provided between said motor and said housing.

BRIEF DESCRIPTION OF THE DRAWING

The invention will be described with reference to the accompanying drawing showing an axial section of a preferred non-limiting embodiment of the same.

DETAILED DESCRIPTION OF THE INVENTION

Number 1 in the accompanying drawing indicates an electromechanical linear actuator comprising a load-bearing body or structure 2 preferably formed from aluminium alloy or similar metal of relatively high specific weight.

Body 2 comprises a substantially rectangular plate 3 having a substantially circular end portion 4 thinner than the remaining portion 5 of plate 3 and constituting the end wall of a substantially cylindrical cup-shaped body 6 integral with plate 3 and having, on the opposite side to portion or wall 4, an opening 7 closed by a circular plate 8 of plastic material.

Body 6 defines a cylindrical chamber 9 housing a d.c. electric motor 10 with a substantially cylindrical outer casing 11. From the opposite surfaces 12 and 13 of casing 11, there project outwards respective cylindrical axial appendixes 14 and 15.

Via the interposition of a plastic sleeve 16, appendix 14 engages a hole 17 formed through wall 4, whereas appendix 15 engages a cylindrical compartment 18 formed centrally on a flexible cover 19 connected integral with the inner surface of plate 8.

From the end of sleeve 16 facing inwards of chamber 9, there extends outwards an annular flange 20 arranged contacting the inner surface of wall 4 on one side and, on the other, surface 12 of casing 11 via the interposition of a flexible annular seal 21.

On the opposite side to that supporting body 6, plate 3 is fitted with a cup-shaped body 22 comprising a lateral wall 23, one end of which is fitted with an outer flange 24 connected integral with plate 3 by means of through pins 25 (only one of which is shown), and the other end of which is fitted with an end wall 26. From the portion of wall 26 facing portion 5 of plate 3, there projects outwards a substantially semispherical dome 27 having a tubular radial outer appendix 28 perpendicular to plate 3 and coaxial with a further hole 29 formed through portion 5.

Body 22 is preferably made of plastic and, together with plate 3, defines a chamber 30 fitted through with a screw 31 coaxial with appendix 28 and hole 29, and connected to motor 10 via a drive indicated as a whole by 32, so as to move axially in a direction perpendicular to plate 3.

Drive 32 is housed inside chamber 30, and comprises a belt drive 33 between rotary output shaft 34 of motor 10 and a rotary tubular shaft 35 extending through hole 29 and coaxial with screw 31; and a recirculating-ball screw-nut-screw coupling 36 located between shaft 35 and screw 31.

Shaft 35 is supported by plate 3 via the interposition of a ball bearing 37, the inner ring of which is secured axially to the outer surface of an intermediate portion of shaft 35 via two retaining rings 38, and the outer ring of which is locked inside hole 29 by a shoulder 39 on one side and by a retaining ring 40 on the other. One end of shaft 35 is supported by wall 26 via a spherical joint 41 comprising a semispherical seat 42 formed inside dome 27, and a spherical head defined by a bush 43, a cylindrical through hole 44 of which is engaged in rotary manner by shaft 35, and the substantially spherical outer surface of which is maintained contacting seat 42 by a lock washer 45.

Drive 33 comprises two toothed pulleys 46 and 47 fitted respectively on to shaft 34 and on to shaft 35 in the space between bearing 37 and bush 43. Drive 33 also comprises a toothed belt 48 looped about pulleys 46 and 47, and extending parallel with plate 3 inside chamber 30. Coupling 36 is of known type, comprising a relatively lightweight nut screw 49 preferably formed from rolled sheet metal. Nut screw 49 is integral and coaxial with shaft 35, and connected to screw 31 via the interposition of a number of spheres 50.

Coupling 36 is preferably protected by a cover 51 (shown by the dotted line) connected to plate 3 by means of pins 25.

The first point to note in connection with the above description is the manner in which electric motor 10 is supported flexibly inside chamber 9, by virtue of the opposed elastic elements consisting of seal 21 on the one hand and cover 19 on the other, which provide for flexible axial suspension of motor 10. Moreover, by flexibly supporting appendix 15 of casing 11 inside compartment 18, cover 19 also provides for radial suspension of motor 10 and for preventing casing 11 of the same from vibrating in contact with cylindrical body 6.

In other words, therefore, by virtue of being flexibly suspended inside chamber 9, the vibration transmitted to plate 3 by motor 10 is of practically negligible frequency and amplitude, which vibration is further dampened by the weight of plate 3 itself. Moreover, belt 48 and plastic body 22 substantially eliminate any danger of the vibration produced by motor 10 being transmitted directly to nut screw 49 via drive 33 and joint 41.

It follows therefore that, despite being relatively lightweight, nut screw 49 is extremely stable in use, by virtue of being affected only negligibly by the vibration of motor 10, and is maintained perfectly parallel to shaft 34 by the two supports, consisting of bearing 37 and joint 41, connected to shaft 35 on opposite sides of pulley 47.

I claim:

1. An electromechanical linear actuator comprising an electric motor with a rotary output shaft; a load-bearing structure defining a housing for said electric motor; a tubular shaft substantially parallel to said output shaft and having a first portion connected in rotary manner to said load-bearing structure; an output member coaxial with said tubular shaft; parallel rotary shaft drive means for drivingly connecting said tubular and said output shafts and being located between said tubular and said output shafts; and screw-nut-screw coupling means for drivingly connecting said tubular shaft and said output member and being located between said tubular shaft and said output member; characterised by the fact that it also comprises a supporting member integral with said load-bearing structure and having means for connection in rotary manner to a second portion of said tubular shaft, said supporting member being made of plastic; said load-bearing structure being made of relatively heavy material; said drive comprising a flexible drive member; and damping means being provided between said motor and said housing.

2. An electromechanical linear actuator comprising an electric motor with a rotary output shaft; a load-bearing structure defining a housing for said electric motor; a tubular shaft substantially parallel to said output shaft and having a first portion connected in rotary manner to said load-bearing structure; an output member coaxial with said tubular shaft; parallel rotary shaft drive means for drivingly connecting said tubular and said output shafts and being located between said tubular and said output shafts; and screw-nut-screw coupling means for drivingly connecting said tubular shaft and said output member and being located between said tubular shaft and said output member; characterised by the fact that it also comprises a supporting member integral with said load-bearing structure and having rotary connecting means for connection in rotary manner to a second portion of said tubular shaft, said rotary connecting means includes a spherical joint; said load-bearing structure being made of relatively heavy material; said drive comprising a flexible drive member; and damping means being provided between said motor and said housing.

3. An actuator as claimed in claim 2, characterised by the fact that said rotary connecting means comprise a bush having an inner surface connected in rotary manner to said tubular shaft, and a spherical outer surface; said spherical joint comprising a seat formed on said supporting member, and a spherical head mating with said seat and defined by said bush.

4. An electromechanical linear actuator comprising an electric motor with a rotary output shaft; a load-bearing structure defining a housing for said electric motor; a tubular shaft substantially parallel to said output shaft and having a first portion connected in rotary manner to said load-bearing structure; an output member coaxial with said tubular shaft; parallel rotary shaft drive means for drivingly connecting said tubular and said output shafts and being located between said tubular and said output shafts; and screw-nut-screw coupling means for drivingly connecting said tubular shaft and said output member and being located between said tubular shaft and said output member; characterised by the fact that it also comprises a supporting member integral with said load-bearing structure and having rotary connecting means for connection in rotary manner to a second portion of said tubular shaft; said load-bearing structure being made of relatively heavy material; said drive comprising a flexible drive member; damping means being provided between said motor and said housing; said housing is defined by a hollow elongated body closed at one end by an end wall and at the other end by a cover; and said damping means comprising first and second opposed flexible elements located between the casing of said motor and said wall and said cover respectively.

5. An actuator as claimed in claim 4, characterised by the fact that said casing presents an axial end appendix extending towards said cover said second flexible element consisting of a cover having an axial compartment engaged by said appendix.

* * * * *